(12) United States Patent
Baldwin (10) Patent No.: US 9,385,517 B2
(45) Date of Patent: Jul. 5, 2016

(54) BUSWAY OUTPUT BOX GUIDE/INHIBITOR SYSTEM FOR INSERTION AND REMOVAL OF A BUSWAY OUTPUT BOX

(71) Applicant: Busway Solutions, LLC, Laurel, MD (US)

(72) Inventor: Mark H. Baldwin, Davidsonville, MD (US)

(*) Notice: Subject to any disclaimer, the term of this patent is extended or adjusted under 35 U.S.C. 154(b) by 0 days.

(21) Appl. No.: 14/644,199

(22) Filed: Mar. 10, 2015

(65) Prior Publication Data
US 2015/0288160 A1    Oct. 8, 2015

Related U.S. Application Data

(60) Provisional application No. 61/974,184, filed on Apr. 2, 2014.

(51) Int. Cl.
*H02G 5/08* (2006.01)
(52) U.S. Cl.
CPC ........................ *H02G 5/08* (2013.01)
(58) Field of Classification Search
USPC ............ 174/88 B, 71 B, 86, 481, 50, 58, 504; 439/213, 211, 114, 136
See application file for complete search history.

(56) References Cited

U.S. PATENT DOCUMENTS

| | | | | | |
|---|---|---|---|---|---|
| 3,004,097 | A | * | 10/1961 | Johnston | H02G 5/007 174/88 B |
| 3,287,487 | A | * | 11/1966 | Fehr, Jr. | H02G 3/0608 174/71 B |
| 3,459,874 | A | * | 8/1969 | Fouse | H02G 5/007 174/68.2 |
| 3,614,297 | A | * | 10/1971 | Carlson | H02G 9/065 174/117 FF |
| 3,657,606 | A | * | 4/1972 | Greger | H02G 5/08 200/50.2 |
| 3,882,265 | A | * | 5/1975 | Johnston | H02G 5/08 174/117 FF |
| 4,009,920 | A | * | 3/1977 | Hicks, Jr. | H02G 5/08 174/88 B |
| 4,213,003 | A | * | 7/1980 | Carlson | H02G 5/007 174/68.2 |
| 4,775,328 | A | * | 10/1988 | McCarthy | H01R 25/006 439/211 |
| 4,814,941 | A | * | 3/1989 | Speet | H02H 9/005 174/495 |
| 4,820,178 | A | * | 4/1989 | Anderson | H01R 25/164 439/114 |
| 4,912,599 | A | * | 3/1990 | Wittmer | H02G 5/08 200/50.2 |
| 4,952,164 | A | * | 8/1990 | Weber | H02G 3/288 439/215 |
| 4,959,021 | A | * | 9/1990 | Byrne | H01R 35/02 439/1 |
| 5,038,257 | A | * | 8/1991 | Agabekov | F21S 4/20 174/72 B |
| 5,151,043 | A | * | 9/1992 | Morgan | H02G 5/04 439/100 |
| 5,178,555 | A | * | 1/1993 | Kilpatrick | H02G 3/00 248/222.41 |
| 5,277,609 | A | * | 1/1994 | Ondrejka | A47B 21/06 439/211 |
| 5,322,444 | A | * | 6/1994 | Audehm | H01R 35/00 439/210 |

(Continued)

*Primary Examiner* — Alexander Gilman
(74) *Attorney, Agent, or Firm* — Ronald E. Prass, Jr.; Prass LLP (57) ABSTRACT

Systems and methods are provided for facilitating safe removal of rotational-style output boxes in busway bar power distribution systems particularly configured components to form output box guides. The disclosed schemes render rotational style output boxes for busway bar systems less susceptible to damage introduced by inadvertent or improper removal of the rotational style output boxes in the busway bars. Mechanical structures are provided that substantially inhibit an ability to incorrectly rotate a rotational-style output box during a removal process. A busway output box guide system provides structures associated with and/or attached to at least one of an output box and a busway bar, labeling and warning indication components that inform and substantially inhibit an ability of a user to incorrectly rotate a rotational-style output box in a "wrong" direction particularly when removing the rotational style output box from a busway bar in a power distribution system.

14 Claims, 7 Drawing Sheets

(56) References Cited

U.S. PATENT DOCUMENTS

| | | | | |
|---|---|---|---|---|
| 5,336,097 A * | 8/1994 | Williamson, Jr. | H02G 3/288 | 439/110 |
| 5,419,715 A * | 5/1995 | Laveissiere | H01R 9/2683 | 439/491 |
| 5,525,068 A * | 6/1996 | Graham | H01R 25/161 | 439/114 |
| 5,588,853 A * | 12/1996 | Anthony | H01R 13/5213 | 220/375 |
| 5,595,495 A * | 1/1997 | Johnson | H01R 25/16 | 174/541 |
| 5,783,779 A * | 7/1998 | Graham | H02G 5/007 | 174/88 B |
| 5,861,576 A * | 1/1999 | Langston | H02G 3/105 | 174/481 |
| 5,913,703 A * | 6/1999 | Suzuki | H01R 13/518 | 439/489 |
| 5,998,732 A * | 12/1999 | Caveney | H02G 3/105 | 174/481 |
| 6,180,878 B1 * | 1/2001 | Gretz | H02G 3/0431 | 174/504 |
| 6,362,420 B1 * | 3/2002 | Bacouelle | H02G 3/128 | 174/504 |
| 6,384,336 B1 * | 5/2002 | VanderVelde | H02G 3/128 | 174/503 |
| 6,491,535 B1 * | 12/2002 | Buse | H02G 3/00 | 174/480 |
| 6,677,532 B2 * | 1/2004 | White | H02G 5/061 | 174/133 B |
| 7,307,227 B2 * | 12/2007 | Buettner | H01H 73/08 | 200/51.11 |
| 7,364,476 B2 * | 4/2008 | Mueller | H01R 4/36 | 439/709 |
| 7,410,379 B1 * | 8/2008 | Byrne | H01R 13/652 | 439/215 |
| 7,468,488 B1 * | 12/2008 | Hilgert | H02G 3/0418 | 174/101 |
| 7,648,379 B2 * | 1/2010 | Johnson | H01R 25/16 | 439/215 |
| 7,741,568 B2 * | 6/2010 | Makwinski | H02G 3/0431 | 174/480 |
| 7,744,386 B1 * | 6/2010 | Speidel | H01R 25/145 | 439/118 |
| 7,914,319 B2 * | 3/2011 | Jones | H01R 13/641 | 439/489 |
| 7,952,022 B2 * | 5/2011 | Rippel | H02G 3/125 | 174/50 |
| 8,496,492 B2 * | 7/2013 | Byrne | H01R 25/142 | 439/210 |
| 8,540,526 B2 * | 9/2013 | Mooney | H02G 5/007 | 174/86 |
| 8,550,830 B1 * | 10/2013 | Bhathija | H01R 31/02 | 439/213 |
| 8,684,758 B2 * | 4/2014 | Gharabegian | H01R 9/265 | 439/212 |
| 8,736,106 B2 * | 5/2014 | Byrne | H01R 27/02 | 174/50 |
| 8,857,086 B2 * | 10/2014 | Adams | G09F 3/0295 | 40/647 |
| 8,901,419 B2 * | 12/2014 | Galasso | H01R 13/4536 | 174/53 |
| 9,011,167 B2 * | 4/2015 | Fujiwara | H01B 5/02 | 439/121 |

* cited by examiner

BUSWAY OUTPUT BOX GUIDE/INHIBITOR SYSTEM FOR INSERTION AND REMOVAL OF A BUSWAY OUTPUT BOX

CROSS REFERENCE TO RELATED APPLICATION

This application claims priority to co-owned U.S. Provisional Patent Application No. 61/974,184, entitled "BUSWAY OUTPUT BOX GUIDE/INHIBITOR SYSTEM FOR INSERTION AND REMOVAL OF A BUSWAY OUTPUT BOX," filed in the U.S. Patent and Trademark Office on Apr. 2, 2014, the disclosure of which is hereby incorporated by reference herein in its entirety.

BACKGROUND

1. Field of the Invention

This disclosure is directed to systems and methods for facilitating and simplifying safe insertion and removal of rotational output boxes in busway bar power distribution systems/installations using particularly configured components and component systems to form output box guides and/or output box inhibitor systems providing physical connectivity, and circuit protection to a user's load.

2. Description of Related Art

In recent years, the power distribution industry and the associated market have seen significant increases in the use of busway bar systems, implementations and components for power distribution in various applications. A growing market segment deals with meeting the extensive power distribution requirements for the many and varied electronic and electrical system components that are installed in large data centers. Flexibility in configurations and installations for the electrically-driven and/or powered electronic components in these data centers led to a requirement for flexible, and on-site adaptable, power distribution systems that are easily reconfigurable, often by non-licensed end-user personnel, to place the installed electrical power source receptacles (output boxes) where they are needed without loose wiring being hazardously routed throughout the data center or in any portion thereof.

Power distribution systems including busway bar components have been deployed in large data centers, and in support of other industrial and manufacturing requirements, since the late 1990's. Busway bar component power distribution systems continue to capture an increasing percentage of the data center power distribution market based on the flexibility that these power distribution systems provide in power distribution network configuration and re-configuration, and a coincident growing familiarity with their use.

The data center market was historically serviced by flexible power cord "whips" that were fed from wall-mounted power panels, generally referred to as remote power panels (RPPs), within the data centers. These power cord whips provided the connections to power the computers and various electronic data storage, data server and data processing components installed in the data center. The power cord whips were typically routed from fixed-location power distribution strips through raised-floor plenums that were used to provide cooling air to the computers and various electronic data storage, data server and data processing components installed in fixed locations within the data centers. These data center installations were generally inflexible in supporting configurations of computing and data processing components that were pre-planned and static (generally unchangeable) once installed. Reconfiguration of the raised-floor air handling plenums and associated re-routing of power distribution components, including the power cord whips, was generally considered such a major undertaking that it would only be attempted in the context of a complete structural overhaul of the data center.

The explosion in data handling requirements in the last two-plus decades led to a corresponding requirement that the modern large data center be generally flexibly field configurable/re-configurable in order to provide for a most efficient use of the structural spaces within which the computing and data processing components are housed in the modern large data center. This requirement for flexibility has manifested itself within the power distribution industry/market as defining a need for a more user-friendly power distribution system that addresses shortfalls in inflexibility associated with the traditional cumbersome and rigid under floor power distribution systems, including the significant restrictions on access to power distribution components, and a general lack in any simple manner by which to reconfigure the power distribution system within a particular space, as needs may arise, after initial configuration and installation.

Overhead busway bar power distribution systems were introduced to address certain of the shortfalls enumerated above. These busway bar power distribution systems today provide an appropriate capacity for reconfiguration of power distribution networks to support evolving needs within the large data centers. As widespread use of busway bar power distribution systems has taken hold, certain safety considerations have arisen that need to be addressed. It is reasonably easy to understand that power distribution systems that were generally inaccessible under raised flooring components tended to produce little risk to end-user personnel operating within a particular space in an industrial environment such as a data center. Overhead busway bar power distribution systems are, by their very nature, "open" to users within a particular space. As these systems have matured, safety considerations have evolved in parallel with an evolution of their structural integrity. Overhead busway bar power distribution systems are UL857-listed, for example, meaning that these systems are finger probe safe and rated to 600 VAC or 600 VDC. These limitations allow non-licensed personnel to undertake certain service tasks that include installing the output boxes that are components of these systems. The power distribution industry has marketed these systems as user-friendly and user-safe for installing and removing the output boxes without the need for licensed electricians. As a result, the installation base for these busway bar power distribution systems is very large, i.e., encompassing literally hundreds of miles of installed busway.

There are numerous manufacturers of busway bar power distribution systems and the associated installation components, including output boxes. Many conventional busway bar power distribution systems in use employ what is referred to as a "stab in" method for insertion and/or removal of the output boxes in the busway bars. With these stab in installations, it is generally difficult to attempt to, or to actually, incorrectly install an output box in, or remove an output box from, the busway bar in a manner that may damage the output box or expose the individual conducting the installation/removal to a hazard of electrocution.

SUMMARY

Other busway bar power distribution systems employ rotational style output boxes. The use of rotational style output boxes increases the flexibility in reconfiguring the overall power distribution system. Current rotational style output boxes are intended to be inserted into the busway bars and then rotated in a specified direction in order to achieve the required structural and electrical connectivity, between the output boxes and the busway bars to which the output boxes are assembled for use.

Presently, there are estimated hundreds of thousands of rotational style output boxes installed in busway bar power distribution systems, including those systems supporting large data centers across America. This large installation base is exposing the operators/users of these busway bar power distribution systems to a level of risk associated with improper rotation of these output boxes, for example, from the busway bars in which they are installed. These risks include the potential for electrocution and exposure to arc flash. Improper rotation of these output boxes can result in severe damage to the output boxes or power heads. Damaged output boxes or power heads can expose users to grave risks. Damage to an output box or power head, for example, may result in exposing the internal wiring of the output box or power head in a manner that hazards personnel and/or otherwise that causes a short circuit between the output box or power head and an energized busway bar to which the output box or power head is attached for use in the power distribution system. Based on this, it can be easily recognized that improper rotation of a rotational output box or power head has a high potential of exposing a typical user to a significant risk of electrocution, and otherwise exposing connected equipment, e.g., powered computer, data storage, data server and/or data processing components and other critical/sensitive loads, to the potential for severe and costly damage.

This disclosure is directed to systems and methods for facilitating and simplifying safe insertion and removal of rotational output boxes in busway bar power distribution systems/installations using particularly configured components and component systems to form output box guides and/or output box inhibitor systems providing physical connectivity, and circuit protection to a user's load.

In view of the above concerns, it may be advantageous to provide systems, methods, techniques, and/or structures associated with rotational style output boxes for installation in busway bar power distribution systems that may render those rotational style output boxes for the busway bar systems less susceptible to damage introduced by inadvertent or improper rotational installation and/or removal of the rotational style output boxes in the busway bars. Introduction of mechanisms and structures that substantially inhibit an ability to incorrectly rotate a rotational type output box during an installation or removal process will generally increase the safety of users in handling the rotational style output boxes in these operations.

Exemplary embodiments of the systems and methods according to this disclosure may provide a busway output box guide system (or inhibitor system) that is usable to facilitate correct insertion and removal of a rotational style output box in a busway bar power distribution system. Note that the terms "guide(s)" and "inhibitor(s), and "guide system(s)" and "inhibitor systems(s)" will be used interchangeably throughout this disclosure.

Exemplary embodiments may provide structures associated with and/or attached to at least one of an output box and a busway bar, and that are field-configurable, even by non-licensed users, to prevent or otherwise substantially inhibit an ability of the users to incorrectly rotate a rotational style output box in a "wrong" direction particularly when removing the rotational style output box from, a busway bar in a power distribution system.

Exemplary embodiments are intended to increase personnel safety, and reduce the potential for equipment damage, throughout the existing large installation base of hundreds of thousands of these rotational style output boxes by providing a configuration that may be retrofit into existing busway bar power distribution system installations.

In embodiments, the disclosed output box guide systems and inhibitor systems may provide structures to be installed by individual users, whether dealing with previously-installed busway bar power distribution systems, or new installations of such systems, in a manner that will expose these users to less risk associated with accidental incorrect execution of the removal processes thereby providing a safer environment for, for example, data center operators/users.

Exemplary embodiments may provide for post-installation attachment of directional labels on an output box or busway bar to instruct a user of a proper direction to rotate the output box for safe removal of the output box from the busway bar. Conventional labeling is generally limited to instructing the installation process and, while well-intentioned, is often hidden from view after installation of the output box in the busway bar. Thus, conventional labeling does not provide positive control regarding the removal processes.

In embodiments, the disclosed schemes may provide solid structures and/or labeling that substantially eliminate the possibility for improper over rotation of the rotational style output boxes in the insertion processes and/or improper incorrect directional rotation of the output boxes in the removal processes in support of a safer working environment.

Exemplary embodiments may adequately address additional issues that may arise when an output box or power head has to be changed in the field to allow the 180 degree orientation change, commonly referred to as "reversed direction," to be implemented. In such optional installations, a dangerous condition is often created as a result of any factory labeling not being modified and therefore being incorrect for any removal operation for an output box or power head that is inserted in the reversed direction from a field change of the output box or power head.

Exemplary embodiments are intended to achieve, among other objectives, an increased level of safety and security with respect to a real time/field adjusted ability of a rotational style busway, in support of increased personnel and installed system protection.

Exemplary embodiments are intended to present structures that are ideal for retro fitting into the existing large installation base of rotational style busway bar output boxes. A user of busway bar power distribution systems supplemented with the disclosed guide/inhibitor components and an easily changeable labeling system may benefit from a safer work environment and assure a safer installation base for all subsequent users.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating and simplifying safe insertion and removal of rotational style output boxes in busway bar power distribution systems/installations using particularly configured components to form an output box guide and/or output box inhibitor system providing physical connectivity, and circuit protection to a user's load, according to this disclosure, will be described, in detail, with reference to the following drawings, in which.

DETAILED DESCRIPTION OF EMBODIMENTS

The systems and methods for facilitating and simplifying safe insertion and removal of rotational style output boxes in busway bar power distribution systems/installations using particularly configured components to form an output box guide and/or output box inhibitor system providing physical connectivity, and circuit protection to a user's load, according to this disclosure will generally refer to these specific utilities for those systems and methods. Exemplary embodiments described and depicted in this disclosure should not be interpreted as being specifically limited to any particular configuration of the disclosed guide/inhibitor systems, the discussed rotational style output boxes or power heads, the discussed busway bars for receiving the rotational style output boxes or power heads, and/or other components of busway bar power distribution systems, as well as overall configurations of the busway bar power distribution systems as a whole. In this regard, it should be recognized that any advantageous use of the systems and methods for including guide or inhibitor components that may be usable in substantially reducing instances of improper rotational style output box installation in, or particularly removal from, associated busway bars employing structural components, physical systems, processes, techniques, methods, schemes, and/or particularly-configured adaptable, attachable and/or retro-fittable guide/inhibitor appliances as are generally outlined in this disclosure, particularly to reduce occasions of damaging the output boxes to an extent that user personnel are exposed to electrocution and/or arc flash hazards, and installed equipment is exposed to potential for severe damage, is contemplated as being included within the scope of the disclosed exemplary systems and methods.

The systems and methods according to this disclosure will be described as being particularly adaptable to use in busway bar power distribution systems that are installed for use in large data centers. These references are meant to be illustrative only in providing a single real-world utility for the disclosed systems and methods, and should not be considered as limiting the disclosed systems and methods to any particular product, system or combination of components, or to any particular type or manufacture of a busway bar power distribution system in which the described and depicted guide systems and schemes may be advantageously employed. Any commonly-known busway bar power distribution system in which rotational style output boxes or power heads are used that may be adapted according to the specific capabilities and the retro-fittable configurations of guide/inhibitor components and appliances discussed in this disclosure is contemplated.

The disclosed embodiments are intended, among other objectives, to provide a safer operating environment in which power distribution is facilitated via a busway bar power distribution system by substantially limiting the potential for electrocution/arc flash and equipment destruction hazards associated with damage to a rotational style output box or power head that may be produced by rotating the rotational style output box or power head in a "wrong" direction during a removal of the output box or power head from the busway bar.

In embodiments, a safety system is provided that assists users by substantially physically preventing the improper removal of an output box in a rotational style busway system. Embodiments of the disclosed systems may be factory or field installed. Embodiments of the disclosed systems may be provided in, for example, kit form including all of the components for retro-fitting guide/inhibitor appliances on the hundreds of thousands of currently-installed rotational style output boxes in support of safety objectives. Embodiments of the disclosed systems may be flexible enough to protect an output box installation that has been reversed, thereby providing a 180 degree changed orientation of the output box receptacle, circuit breaker/fused device or component, and monitoring display. This flexibility allows the end user to setup the disclosed guide(s) or inhibitor(s) to real site conditions for maximum safety.

Figure 1A:
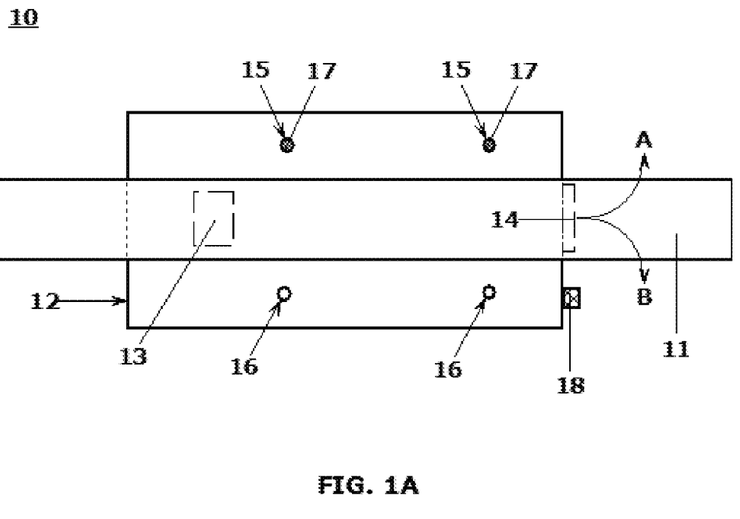
FIGS. 1A and 1B illustrate a block diagrams of a portion of a busway bar power distribution system including first exemplary embodiments of an output box guide system according to this disclosure.
Figure 1B:
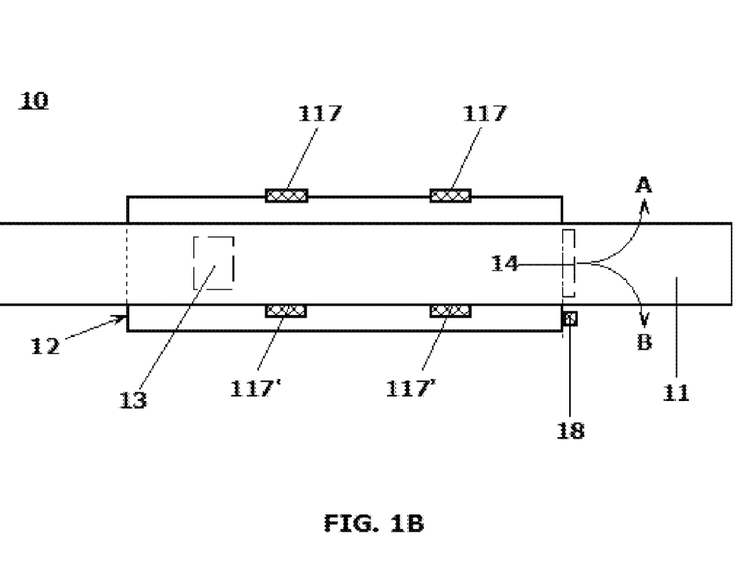

FIGS. 1A and 1B illustrate block diagrams of a portion of a busway bar power distribution system including first and second exemplary embodiments of an output box guide system 10 according to this disclosure. As shown in FIGS. 1A and 1B, a rotational style output box 12 may be installed in a busway bar 11 in the busway bar power distribution system for use. A typical installation may include the output box 12 being installed under the busway bar 11 in a manner that the output box 12 is suspended from the busway bar 11. Insertion of the output box 12 with respect to the busway bar 11 occurs by aligning the output box 12, and a power head extension 13 from the output box 12, with the busway bar 11 and inserting the power head extension 13 into the busway bar 11. The output box 12 is rotated into position in the busway bar 11 as will be shown in additional figures below. The disclosed rotation aligns paddles (or other protruding components) on power head extension 13 of the output box 12 into contact with phase conductors in the busway bar 11. Removal of the output box 12 with respect to the busway bar 11 occurs by reversing the insertion process. Labeling 14 may be attached to one or more of the external surfaces of the output box 12 to provide, for example, directional arrows as a guide to be used to show a user a desired rotational direction for removal of the output box 12 from the busway bar 11 in, for example, the directions of the arrows A,B, as appropriate.

According to the disclosed schemes and as shown in FIG. 1A, guide/inhibitor holders 15,16 may be provided in the output box 12. These guide/inhibitor holders 15,16 may be in a form of structural holes in the output box 12. The guide/inhibitor holders 15,16 may be located at varying positions on a surface of the output box 12 that faces the busway bar 11 when the output box 12 is installed in the busway bar 11. Guide/inhibitor holders 15,16 may be otherwise located at varying positions on a surface of the busway bar 11. Depending on a direction for inserting the output box 12 in the busway bar 11, or removing the output box 12 from the busway bar 11, guide/inhibitor rods 17 may be varyingly inserted into guide/inhibitor holders 15 or 16.

More generally, the guide/inhibitor rods 17 may be configured in a manner that allows for their insertion into cooperating receptacles in the output box 12, or may be otherwise configured in a manner that allows for the guide/inhibitor rods 17 to be attached or affixed to one or more of the surfaces of the output box 12. According to the disclosed schemes and as shown in FIG. 1B, guide/inhibitor rods/components 117 may be provided directly on the output box 12. The guide/inhibitor rods/components 117 may be located at varying positions on surfaces of the output box 12 to project in a direction of the busway bar 11 when the output box 12 is installed in the busway bar 11. Guide/inhibitor rods/components 117' may be otherwise located at varying positions on a surface of the busway bar 11 to project in a direction of the output box 12 when the output box 12 is installed in the busway bar 11. In these configurations, physical interaction between the guide/inhibitor rods 17 (and the guide/inhibitor rods/components 117,117') and the busway bar 11 or the output box 12 may inhibit, or substantially prevent, improper rotation of the output box 12 in an insertion or removal operation.

In embodiments, a construction of the disclosed system may include the guide/inhibitor holders 15,16 being either factory punched, or field punched holes in the output box 12. In instances in which the guide/inhibitor holders 15,16 are to be field punched holes, the output box 12 may be appropriately semi-punched, or otherwise mechanically scored, in order to facilitate field punching of the guide/inhibitor holders 15,16. An objective of the configuration of the cooperating components is to ensure that the guide/inhibitor rods 17 may be easily inserted into, and removed from, the guide/inhibitor holders 15, 16. Another objective of the configuration of the cooperating components is that the guide/inhibitor rods 17, once installed, may securely remain inserted in the guide/inhibitor holders 15,16. In embodiments, the guide/inhibitor rods 17 (or the guide/inhibitor rods/components 117,117') may protrude from an upper surface of the output box 12 in a sufficient height as to match a vertical profile (height) of the busway bar 11.

It should be recognized that mounting locations and means for the guide/inhibitor rods 17 (and the guide/inhibitor rods/components 117,117') with respect to the output box 12 or the busway bar 11 are not limited to only the depicted configurations. Mounting locations may include, for example, holes (as shown), open slots, or other opening/indentations in a surface of the output box 12 or an outer surface of the busway bar. Mounting means are not limited to configurations in which, for example, the guide/inhibitor rods 17 are necessarily inserted into some cooperating opening such as, for example, the guide/inhibitor holders 15, 16 as shown in FIG. 1A. Virtually any means by which guide/inhibitor rods 17 (and guide/inhibitor rods/components 117,117') may be affixed, or otherwise attached, to the output box 12 or the busway bar 11 are contemplated. Such mounting means may include, but are not limited to, attachment using cooperating hook and pile (Velcro®) strips, tapes, glues and the like. Such mounting means may also, or otherwise, mechanical means for attaching the guide/inhibitor rods 17 to the output box 12. These mechanical means may include, for example, hardware attachment using mechanical tabs, screws, nuts and bolts, clips, clamps, straps, combinations of these and the like.

The guide/inhibitor rods 17 (and the guide/inhibitor rods/components 117,117') may be formed of any sufficiently rigid material to withstand, for example, impact with the busway bar 11 in instances where an output box 12 with the guide/inhibitor rods 17 (or the guide/inhibitor rods/components 117,117') protruding therefrom, will not cause the guide/inhibitor rods 17 (or the guide/inhibitor rods/components 117,117') to break, thereby rendering them potentially less effective. Materials from which the guide/inhibitor rods 17 (or the guide/inhibitor rods/components 117,117') may be formed include metals, plastics/thermoplastics, ceramics, glass/fiberglass, wood and other like materials. Additionally, the cross-section of the guide/inhibitor rods 17 (and the guide/inhibitor rods/components 117,117') may be in any one or more of various shapes including round, square, rectangular, oblong, triangular and others when the guide/inhibitor rods 17 (and the guide/inhibitor rods/components 117,117') are viewed from an axial end.

An indicator component 18 may be provided on, or associated with, the output box 12. The indicator component 18 may include, for example, an indicator light. The indicator light may be usable, for example, to indicate that the output box 12 is in a "safe" condition for a user to undertake a removal operation. Such a "safe" condition may include, for example, that an output load from the output box 12 is de-energized.

As indicated above, objectives of the disclosed schemes include, without limitation, providing an added degree of safety for user personnel in preventing the potential for a electrocution and/or arc flash, or for equipment in preventing the potential for damage that may result from improper insertion of the output box 12 in the busway bar 11, or improper removal of the output box 12 from the busway bar 11 when using a rotational style busway bar (plug-in) power distribution system. The flexibility provided in being able to insert the guide/inhibitor rods 17 in different pairs of guide/insertion holders 15 or 16, or in being able to attach the guide/inhibitor rods/components 117,117' in various locations and configurations on the output box 12 or on the busway bar 11, provides a simple manner by which to accommodate both a normal orientation output box installation and a reversed orientation output box installation in the field. With a recognition that improper or over rotation of the output box 12 may result in damage to the output box 12 itself, and/or hazard to personnel and equipment, based on improper alignment of, for example, power head paddles with the phase power in the busway bar 11 resulting in the potential for short-circuit, the disclosed cooperating structures are intended to provide a simple cooperating system of components that substantially prevent this improper or over rotation of the output box 12 with respect to the busway bar 11, particularly in a removal process.

Figure 2A:
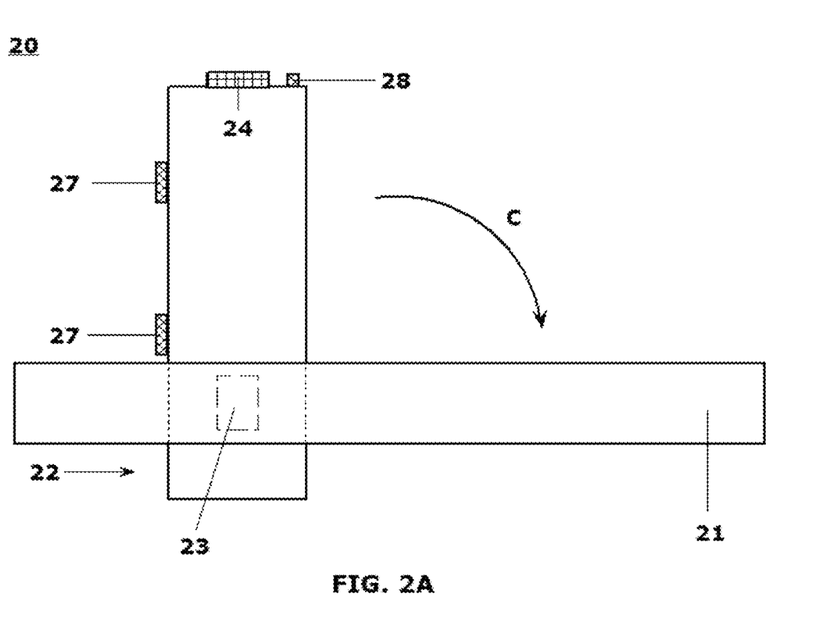
FIGS. 2A and 2B illustrate block diagrams of an exemplary insertion sequence in a "normal" orientation in which an output box including the second exemplary embodiment of the output box guide system according to this disclosure is employed.
Figure 2B:
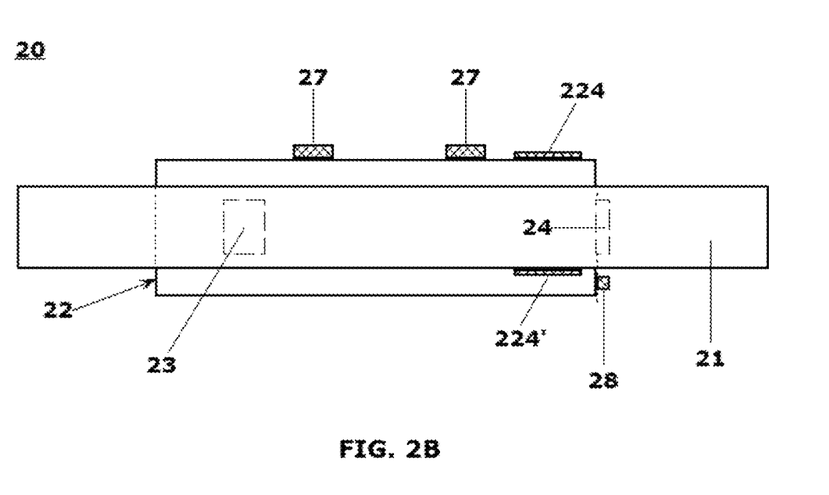

FIGS. 2A and 2B illustrate block diagrams of an exemplary insertion sequence in a "normal" orientation in which an output box including the second exemplary embodiment of the output box guide system 20 according to this disclosure is employed. It should be noted that, for ease of understanding, a similar numbering scheme/convention is adopted in all of the figures. In this regard, FIGS. 2A and 2B depict a busway bar 21, an output box 22, a power head extension 23, a labeling 24, guide/inhibition holders 25,26, guide/inhibition rods/components 27 (installed on the output box 22) and an indicator component 28.

The depicted sequence of operations includes insertion of the output box 22 with respect to the busway bar 21 by aligning the output box 22, and the power head extension 23 from the output box 22, with the busway bar 21. As shown, the initial alignment of the output box 22 with respect to a lengthwise direction of the busway bar 21 may arrange the alignment of the output box 22 to be substantially orthogonal to the lengthwise direction of the busway bar 21. See FIG. 2A. The power head extension 23 may be inserted into the busway bar 21. The output box 22 may then be rotated in direction C, from the relative position shown in FIG. 2A with respect to the busway bar 21 to the relative position shown in FIG. 2B (substantially in alignment with the lengthwise direction of the busway bar 21) to physically secure, and electrically connect, the output box 22 to the busway bar 21 for use. This rotational movement may bring electrical contacts, which may be in the form of paddles, on the power head extension 23 into physical contact with power leads in the busway bar 21.

As mentioned above, the labeling 24 may be provided on the outlet box 22 to show a "proper" rotational direction for the output box 22 with respect to the busway bar 21 for installation in a "normal" installation, as depicted. The guide/inhibitor rods/components 27 may be provided to assist in ensuring that the output box 22 is not improperly or over rotated in the depicted installation process. Once the output box 22 is secured in its final "in use" position, a secondary or replacement labeling may be provided to cover or replace the labeling 24. Otherwise, additional (post installation) labeling 224,224' (associated with the output box guide system) may be provided for proper (instructed) placement on the installed output box 22, or on the busway bar 21 in a vicinity of the installed output box 22. A directional arrow provided on the secondary or replacement labeling may indicate a direction of rotation for the safe removal of the output box 22 from the busway bar 21. In the example shown, it is easy to understand that the directional arrow provided on the secondary or replacement labeling may point in the direction of the side of the output box 22 toward which the guide/inhibitor rods/components 27 are placed. The additional labeling 224 when placed on a same side of the output box 22 (or busway bar 21) as the guide/inhibitor rods/components 27, or in a same direction as the placement of the guide/inhibitor rods/components 27, may include instructions for proper removal of the output box 22 with respect to the busway bar 21, e.g., "PULL TO REMOVE," or other like nomenclature. Conversely, or additionally, the additional labeling 224' when placed on an opposite side of the output box 22 (or busway bar 21) as the guide/inhibitor rods/components 27, or in an opposite direction as the placement of the guide/inhibitor rods/components 27, may also include instructions for proper removal of the output box 22 with respect to the busway bar 21, e.g., "PUSH TO REMOVE," or other like nomenclature. These configurations may provide a straightforward crosscheck between the directional arrow or the instructions indicating a safe removal rotational direction provided on the replacement or additional labeling and the physical structure of the output box 22 with the guide/inhibitor rods/components 27 installed.

As will be discussed in more detail below, exemplary embodiments of the guide/inhibitor rods/components 27 may be in a form of a separately attachable appliance that may be provided in a kit form to be retrofitted to output boxes 22 and busway bars 21 currently installed and in use. Such appliance kits may be configured to be retrofitted to the output boxes 22 or the busway bars 21 without requiring any physical modification of the output boxes 22 and/or the busway bars 21, or any disturbance of the output box installations in the busway bars. These appliance kits may be configured with the additional (post-installation) labeling 224,224' already affixed on, etched into, or otherwise associated with the appliances.

Figure 3A:
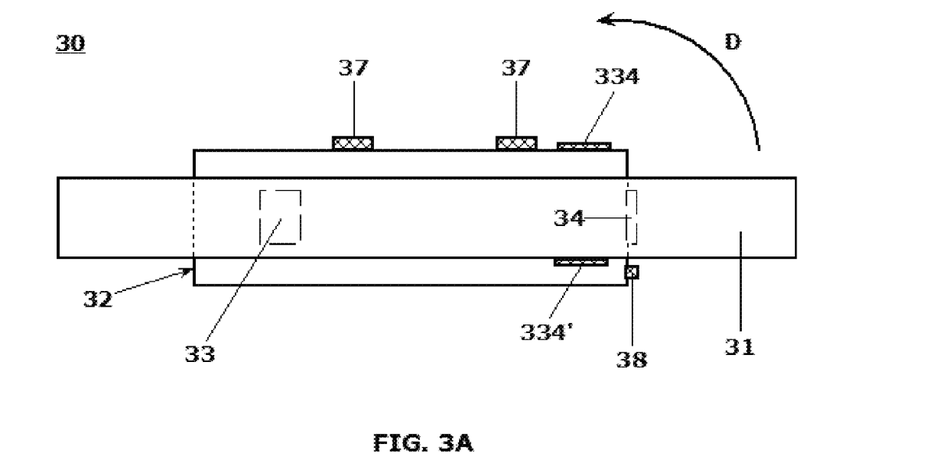
FIGS. 3A and 3B illustrate block diagrams of an exemplary removal sequence in the "normal" orientation in which an output box including the second exemplary embodiment of the output box guide system according to this disclosure is employed.
Figure 3B:
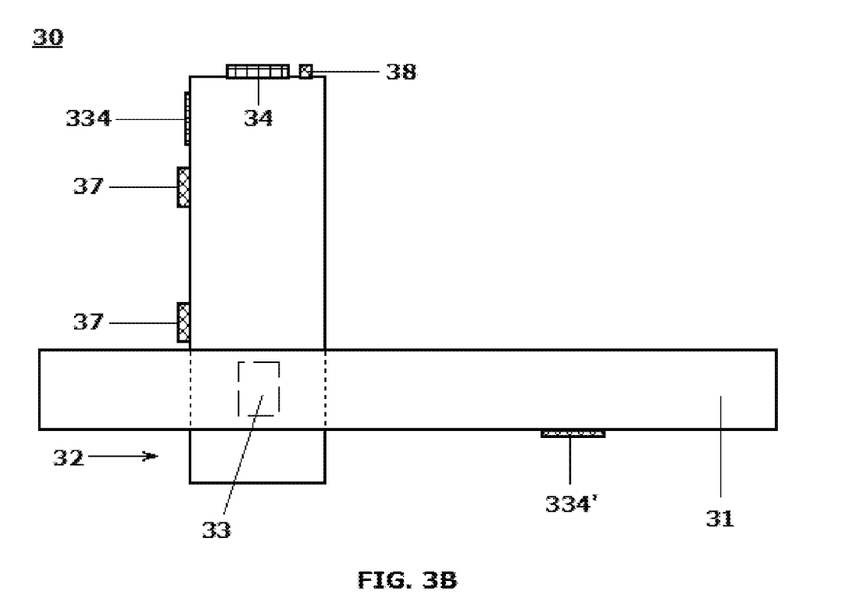

FIGS. 3A and 3B illustrate block diagrams of an exemplary removal sequence in the "normal" orientation in which an output box including the second exemplary embodiment of the output box guide system 30 according to this disclosure is employed. FIGS. 3A and 3B depict a busway bar 31, an output box 32, a power head extension 33, a labeling 34, guide/inhibition rods/components 37 (installed on the output box 32), an indicator component 38 and additional labeling 334,334'.

In the depicted sequence of operations, the output box 32 is in its "in use" position with respect to the busway bar 31, i.e., substantially aligned with a lengthwise direction of the busway bar 31. A user may approach the installation and consult a directional arrow on the labeling 34, instructions on the additional labeling 334,334' (in the manner generally discussed above) and/or otherwise determine an installed position of the guide/inhibitor rods/components 37 on the output box 32. Such inspection of the installation and/or labeling may cause the user to be informed of the direction that the output box 32 may be safely rotated for removal from the busway bar 31. The user may also be informed of a condition of the output box 32 to support removal by observation of the indicator component 38. With this information, inspection and/or observation, the user may rotate the output box 32 substantially in direction D from the position shown in FIG. 3A to a substantially orthogonal position of the output box 32 with respect to the busway bar 31, as shown in FIG. 3B. This rotational movement of the output box 32 with respect to the busway bar 31 is the first step in physically disconnecting the output box 32 from its secure "in use" position with respect to the busway bar 31. This rotational movement of the output box 32 further electrically disconnects the output box 32 from the busway bar 31 for safe removal by, for example, breaking the electrical and physical contact between the paddles on the power head extension 33 with the power leads in the busway bar 31.

Whether the user is informed by the labeling information, or an inspection/observation of a condition of the output box 32, or not, the presence of the guide/inhibitor rods/components 37 may provide a safety precaution to substantially inhibit the user from improperly rotating the output box 32 in a "wrong" direction to attempt removal from the busway bar 31. In other words, should the user attempt to rotate the output box 32 in an incorrect direction for removal, the guide/inhibitor rods 37 would make contact with the busway bar 31 in a manner that would substantially prevent further damaging rotation of the output box 32 in the "wrong" direction, or at least inform the user of such damaging rotation.

Once the output box 32 is rotated with respect to the busway bar 31 to the substantially orthogonal alignment position shown in FIG. 3B, the output box 32 may then be removed from the busway bar 31 by moving the output box 32 in a direction away from the power head extension 33 until the power head extension 33 disengages and is pulled clear from the busway bar 31.

Figure 4A:
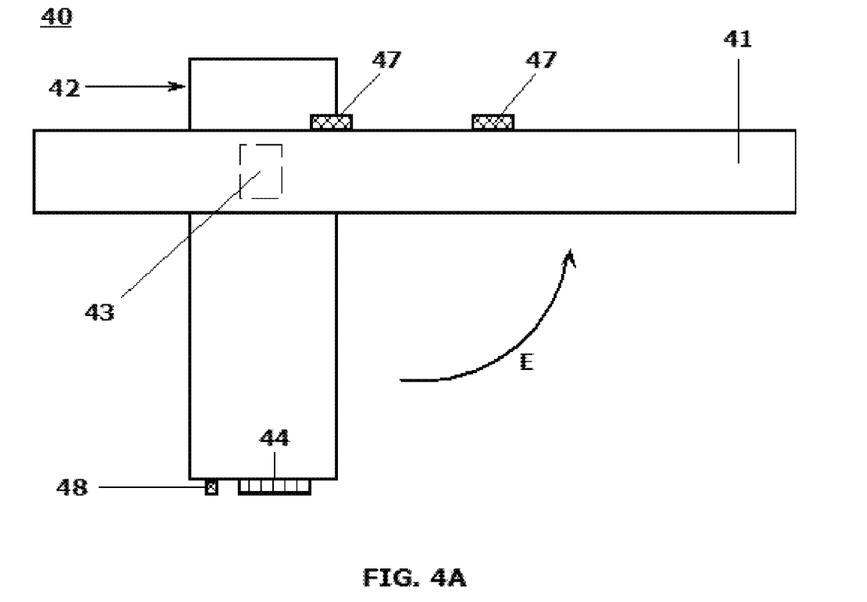
FIGS. 4A and 4B illustrate block diagrams of an exemplary insertion sequence in a "reversed" orientation in which an output box including the second exemplary embodiment of the output box guide system according to this disclosure is employed.
Figure 4B:
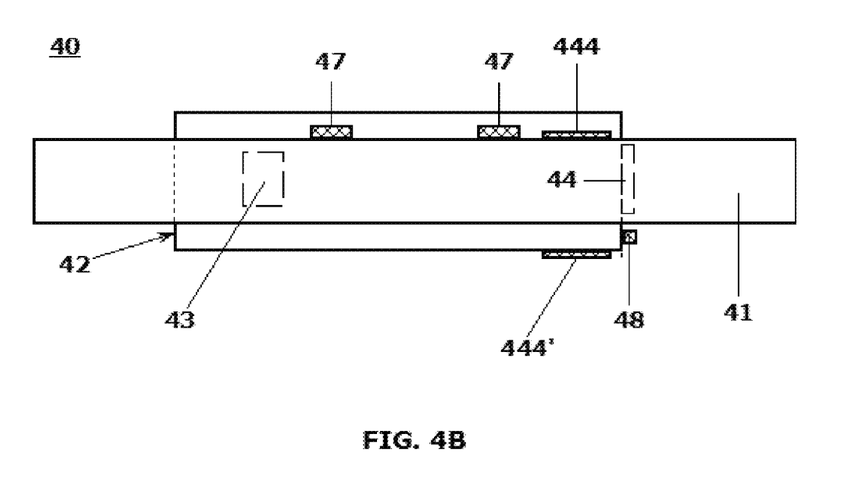

FIGS. 4A and 4B illustrate block diagrams of an exemplary insertion sequence in a "reversed" orientation in which an output box including the second exemplary embodiment of the output box guide system 40 according to this disclosure is employed. FIGS. 4A and 4B depict a busway bar 41, an output box 42, a power head extension 43, a labeling 44, guide/inhibition rods components 47 (installed on the busway bar 41) and an indicator component 48.

In like manner to the insertion sequence in a "normal" orientation shown in FIG. 2, and as described above, the depicted sequence of operations includes insertion of the output box 42 with respect to the busway bar 41 by aligning the output box 42, and the power head extension 43 from the output box 42, with the busway bar 41. Again here, the initial alignment of the output box 42 with respect to the lengthwise direction of the busway bar 41 may arrange the alignment of the output box 42 to be substantially orthogonal to the lengthwise direction of the busway bar 41. See FIG. 4A. The power head extension 43 may be inserted into the busway bar 41. The output box 42 may then be rotated in direction E, from the relative position shown in FIG. 4A with respect to the busway bar 41 to the relative position shown in FIG. 4B (substantially in alignment with the lengthwise direction of the busway bar 41) to physically secure, and electronically connect, the output box 42 to the busway bar 41 for use. This rotational movement may structurally secure and electrically connect the output box 42 to the busway bar 41.

The labeling 44 may be provided on the outlet box 42 to show a proper rotational direction for the output box 42 with respect to the busway bar 41 for installation of the output box 42 in the busway bar 41 in a "reversed" installation, as depicted. The guide/inhibitor rods/components 47 may be provided to assist in ensuring that the output box 42 is not improperly or over rotated in the depicted installation process. Once the output box 42 is secured in its final "in use" position, a secondary or replacement labeling, and/or additional labeling 444,444', may be provided in the manner discussed above.

Figure 5A:
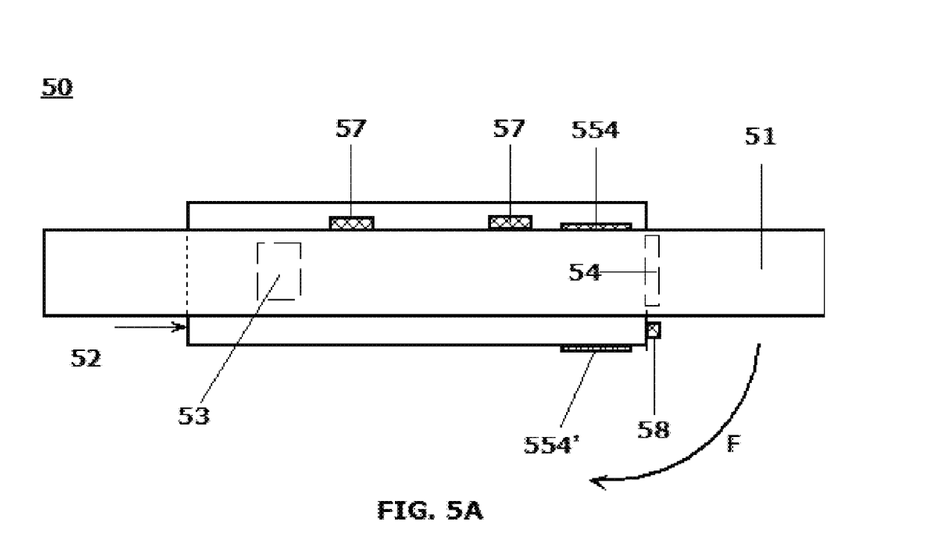
FIGS. 5A and 5B illustrate block diagrams of an exemplary removal sequence in the "reversed" orientation in which an output box including the second exemplary embodiment of the output box guide system according to this disclosure is employed.
Figure 5B:
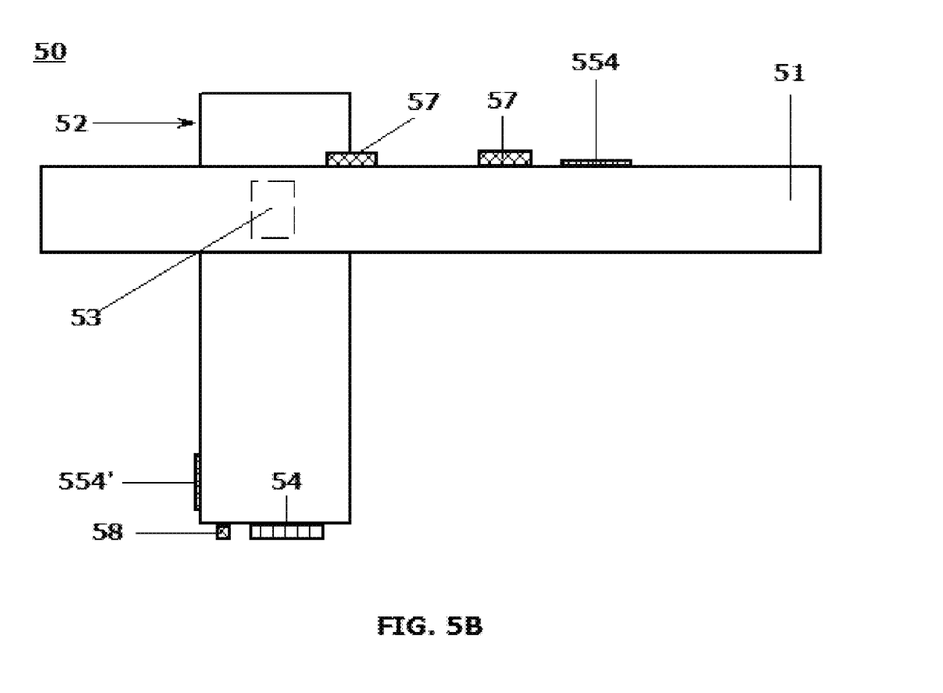

FIGS. 5A and 5B illustrate block diagrams of an exemplary removal sequence in the "reversed" orientation in which an output box including the first exemplary embodiment of the output box guide system 50 according to this disclosure is employed. FIGS. 5A and 5B depict a busway bar 51, an output box 52, a power head extension 53, a labeling 54, guide/inhibition rods/components 57 (installed on the busway bar 51) and an indicator component 58.

In the depicted sequence of operations, the output box 52 is in its "in use" position with respect to the busway bar 51, i.e., substantially aligned with a lengthwise direction of the busway bar 51. A user may approach the installation and consult a directional arrow on the labeling 54, instructions on the additional labeling 554,554' (in the manner generally discussed above) and/or otherwise determine an installed position of the guide/inhibitor rods/components 57. Such inspection of the installation and/or labeling may cause the user to be informed of the direction that the output box 52 may be safely rotated for removal from the busway bar 51. The user may also be informed of a condition of the output box 52 to support removal by observation of the indicator component 58. The user may rotate the output box 52 substantially in direction F from the position shown in FIG. 5A to an orthogonal position of the output box 52 with respect to the busway bar 51, as shown in FIG. 5B. This rotational movement of the output box 52 with respect to the busway bar 51 may be the first step in physically disconnecting the output box 52 from its secure "in use" position with respect to the busway bar 51. This rotational movement of the output box 52 further electrically disconnects the output box 52 from the busway bar 51 for safe removal.

The guide/inhibitor rods/components 57 may provide a safety precaution to substantially inhibit the user from improperly rotating the output box 52 in a "wrong" direction to attempt removal. In other words, should the user attempt to rotate the output box 52 in an incorrect direction for removal, the guide/inhibitor rods/components 57 would make contact with the busway bar 51 in a manner that would prevent damaging rotation in the "wrong" direction.

Once the output box 52 is rotated with respect to the busway bar 51 to the substantially orthogonal alignment position shown in FIG. 5B, the output box 52 may then be removed from the busway bar 51 by moving the output box 52 in a direction away from the power head extension 53 until the power head extension 53 disengages and is pulled clear from the busway bar 51.

In the depicted embodiments, the guide/inhibitor rods/components may be installed, mounted, affixed or otherwise attached to the busway bars in a manner that allows the guide/inhibitor rods/components to project from the busway bar in the direction of the output box, or from the output box in the direction of the busway bar. The depicted busway bar mounting configuration and/or method would position the guide/inhibitor rods/components mounted on the side of the busway bar such that guide/inhibitor rods/components may be made to break away from the busway bar in instances in which the output box is rotated in the "wrong" direction. Again here, methods for mounting the guide/inhibitor rods/components may include the cataloged methods described above. These methods may include, for example, using cooperating hook and pile (Velcro®) strips, tapes, glues and the like; and mechanical means using hardware including physical structures, screws, nuts and bolts, clips, clamps and the like.

Figure 6A:
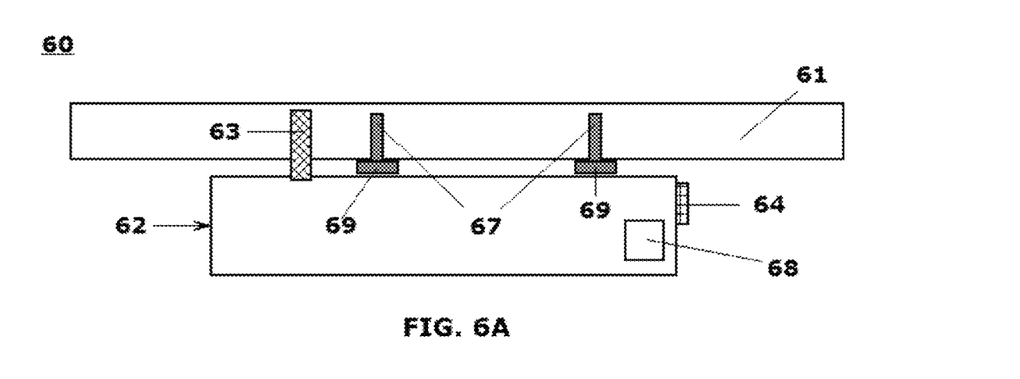
FIGS. 6A-6C illustrate block diagrams of multiple views of a portion of a busway bar power distribution system including a third exemplary embodiment of an output box guide system according to this disclosure.
Figure 6B:
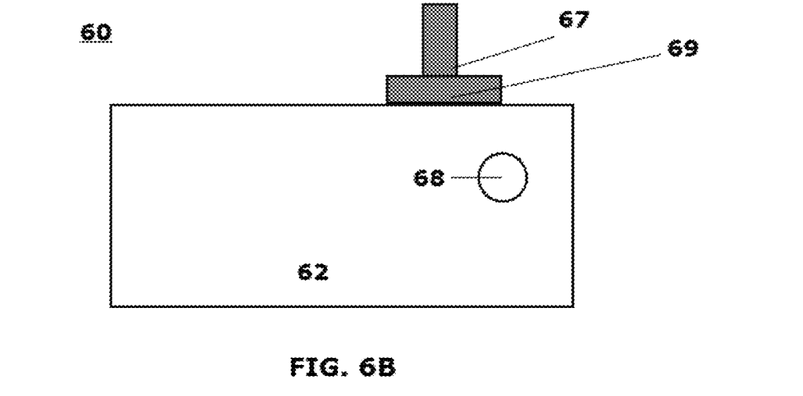
Figure 6C:
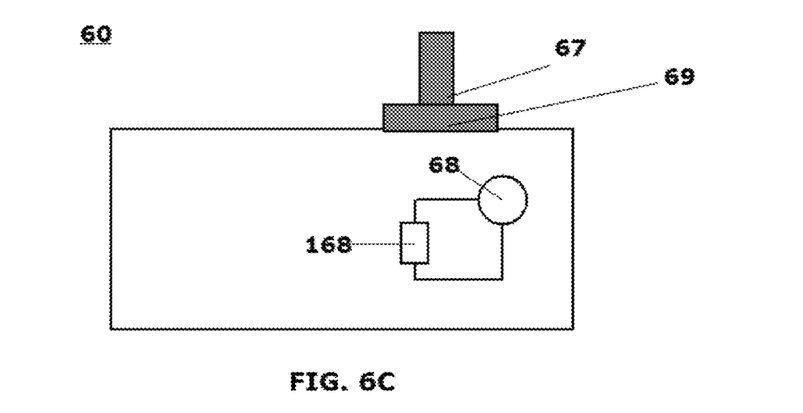

FIGS. 6A-6C illustrate block diagrams of multiple views of a portion of a busway bar power distribution system including a third exemplary embodiment of an output box guide system 60 according to this disclosure. FIGS. 6A-6C depict a busway bar 61, an output box 62, a power head extension 63, labeling 64, guide/inhibition rods/components 67 (installed on the busway bar 61) and an alternate installation of an indicator component 68.

The embodiment(s) shown in FIGS. 6A-6C depict details of an exemplary embodiment of the indicator component 68 that may be employed as a monitoring feature for use in the box guide (inhibitor) system in a busway bar power distribution system. The indicator component 68 and/or monitoring feature may serve the user in at least two ways.

First, the indicator component 68 and/or monitoring feature may reduce the risk to the user in the output box removal process when there is an active load on the output box 62. For example, the indicator component 68 and/or monitoring feature may be employed to reduce the risk of the user de-installing (removing) the output box 62 while the output box 62 remains under a load. In such instances, the removal process may create a damaging arc flash close to the user's face. A sensing circuit on a load side of a circuit breaker when it is open (no load available) may activate a visual indicator, including an indicator light in the indicator component 68 and/or monitoring feature to indicate a condition where there is no active load on the output box 62, thereby indicating that the output box 62 is safe to remove from the busway bar 61.

There are myriad circuit designs that may be available to implement such an indicator component 68 and/or monitoring feature. Such circuit designs include, but are not limited to, use of, for example, a double throw relay to activate the visual indicator. Alternatively, a circuit breaker position may be indicated via a dry "C" contact, or by measuring a current/voltage flow of a load side of the circuit breaker. Activation of the indicator light as a portion of the indicator component and/or monitoring feature may illuminate some particularized signage that the output box 62 is, for example, "safe to remove." Such positive indication to a user may enhance safety by substantially eliminating a potentially dangerous condition that may exist when a user attempts to remove an output box 62 from an energized busway bar 61, or an energized load side of the output box 62.

This indicator component 68 and/or monitoring feature, and components by which to install an indicator component 68 and/or to implement the monitoring feature, may be packaged as a stand-alone retrofit kit, or as a portion of, for example, a guide/inhibitor rod appliance retrofit kit, for field installation on installed system output boxes.

Second, the indicator component 68 and/or monitoring feature may include, for example, a contact device that may be activated to provide one or more of a visual, audible and haptic alarm to a user that tries to improperly rotate the output box 62 in an incorrect direction during a removal process from the busway bar 61. In embodiments, one or more contact devices/pads 69 may be mounted on the output box 62 (substantially in the manner shown in FIGS. 6A-6C) or may alternatively be mounted on the busway bar 61. Upon over rotation, or incorrect rotation, of output box 62 with respect to the busway bar 61, one or more of the guide/inhibitor rods/components 67 may make contact with the contact devices/pads 69 in a manner that such contact may be made to initiate an alarm condition in the indicator component 68 and/or monitoring feature, including one or more of a visual, audible and haptic warning indication. In embodiments, the indicator component 68 and/or monitoring feature may generate a signal to be transmitted to a remote central monitor. When implemented to provide a local alarm, the indicator component 68 and/or monitoring feature may include some type of buzzer component in a circuit 168 to generate an audible alarm in a vicinity of the output box 62. Power for the contact devices 69 may be provided by a fused protected circuit from the output box 62 or may alternatively be provided by an on-board battery source being in, or associated with, the circuit 168, and may be, for example, mounted on a surface of one or more sides of the output box 62. The contact device 69, and audible alarm installed in or associated with the indicator component 68 and/or monitoring feature are not limited to mounting locations such as those shown in FIGS. 6A-6C. Those skilled in the art may determine and implement proper circuitry/configurations, and most advantageous locations, for these components.

Figure 7A:
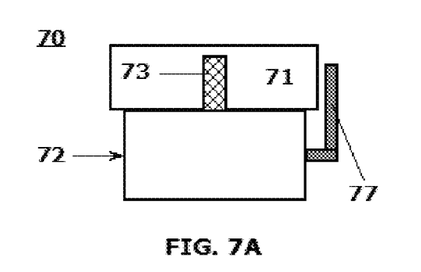
FIGS. 7A and 7B illustrate block diagrams of multiple views of a portion of a busway bar power distribution system including a fourth exemplary embodiment of an output box guide system according to this disclosure.
Figure 7B:
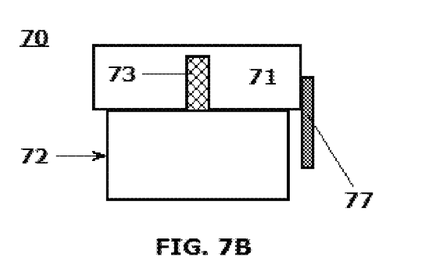

FIGS. 7A and 7B illustrate block diagrams of multiple views of a portion of a busway bar power distribution system including a fourth exemplary embodiment of an output box guide system 70 according to this disclosure. FIGS. 7A and 7B depict a busway bar 71, an output box 72, a power head extension 73, and guide/inhibition components 77.

FIGS. 7A and 7B depict an alternate mounting of guide/inhibitor components 77 on an output box 72 or on a busway bar 71. The output box 72 may be narrower than the busway bar 71. The guide/inhibitor components 77 may be configured in a manner to be offset from the output box 72 to accommodate the narrowness of the output box 72 with respect to the busway bar 71.

Figure 8A:
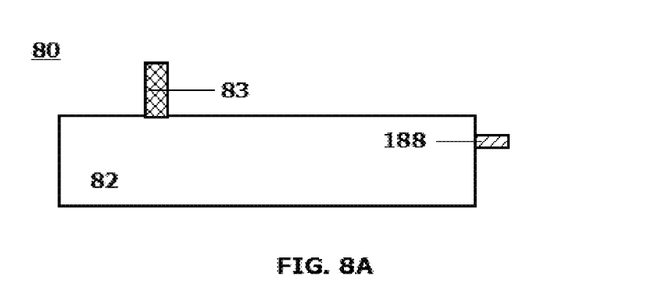
FIGS. 8A-8C illustrate block diagrams of multiple views of a portion of a busway bar power distribution system including a fifth exemplary embodiment of an output box guide system consisting of an adaptable, configurable, attachable and/or retro-fittable guide/inhibitor appliance according to this disclosure.
Figure 8B:
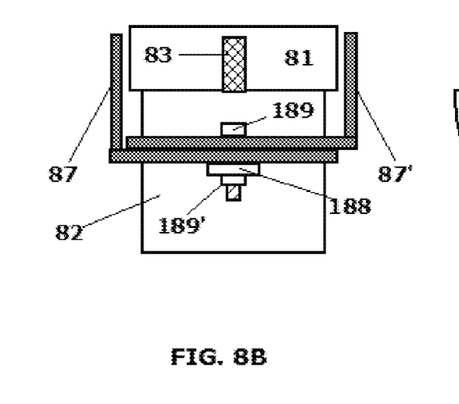
Figure 8C:
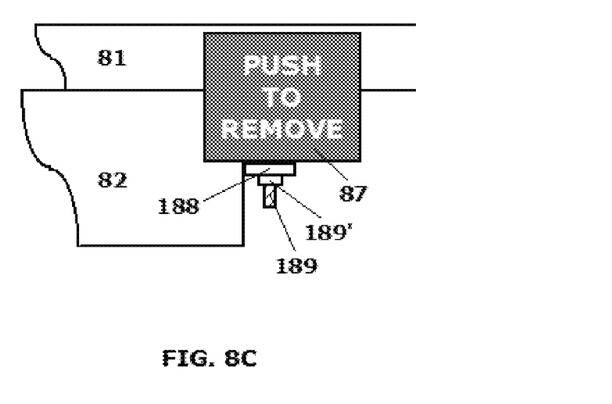

FIGS. 8A-8C illustrate block diagrams of multiple views of a portion of a busway bar power distribution system including a fifth exemplary embodiment of an output box guide system 80 consisting of an adaptable, configurable, attachable and/or retro-fittable guide/inhibitor appliance according to this disclosure. FIGS. 8A-8C depict a busway bar 81, an output box 82, a power head extension 83, and a guide/inhibition appliance 87.

FIGS. 8A-8C depict an alternate mounting of a separate guide/inhibitor appliance 87 (which may comprise multiple components 87,87') on the output box 82. As with the embodiment(s) shown in FIGS. 7A and 7B, the output box 82 may be narrower than the busway bar 81. The guide/inhibitor appliance 87 may be physically mounted to the output box 82 using, for example, a security box mounted tab 188 integrally formed in or on, or separately mounted to, the output box 82, a bolt 189 and cooperating nut 189'. In embodiments, a similarly-configured guide/inhibitor appliance may be alternatively mounted on the busway bar 81. As shown, the guide/inhibitor appliance 87 may have mounted on it, etched into it, or otherwise associated with it, labeling to direct a user as to the proper direction by which to rotate the output box 82 for removal, such as the depicted "PUSH TO REMOVE" nomenclature.

In a broadest context, those of skill in the art will recognize that the disclosed subject matter may enhance safety with regard to removal of rotational type output boxes from busway bars in busway bar power distribution systems. The disclosed embodiments provide a safety-enhancing output box guide/inhibitor system for insertion and removal of rotational type output boxes. The disclosed structures and schemes will help eliminate the possibility of rotation of the output box in a wrong direction with respect to the busway bar where such rotation is recognized as potentially damaging the power head and causing a short circuit that may cause the loss of life and damage to equipment.

Although the above description may contain specific details, they should not be construed as limiting the claims in any way. Other configurations of the described embodiments of the disclosed subject matter are encompassed by the scope of this disclosure. As is indicated above, individual components of the depicted and disclosed exemplary embodiments may be configured and/or provided in a kit form in a manner that would support retrofitting those individual components onto currently-installed rotational type output boxes in a manner that may support the objectives of providing a safer installation/removal process and user working environment. Accordingly, the appended claims and their legal equivalents should only define the subject matter, rather than any specific examples given.

It will be appreciated that various of the above-disclosed and other features and functions, or alternatives thereof, may be desirably combined into other different systems or applications. Also, various alternatives, modifications, variations or improvements therein may be subsequently made by those skilled in the art which are also intended to be encompassed by the following claims.

I claim:

1. A guide system for enhancing safety in busway bar power distribution systems, comprising:
    one or more guide structures that are configured to project from at least one of an output box and a busway bar in a direction of at least an other of the output box and the busway bar,
    the busway bar having an elongated axis,
    the output box being configured to be installed in the busway bar by rotating the output box around a rotational axis that is orthogonal to the elongated axis of the busway bar, the one or more guide structures extending across a plane of an interface between the output box and the busway bar when installed and inhibiting a direction of rotation of the output box with respect to the busway bar around the rotational axis by abutting an outer surface of at least one of the output box and the busway bar, the one or more guide structures being components of a guide appliance, the guide appliance comprising:

a first portion configured to be substantially parallel to the plane of the interface between the output box and the busway bar when installed, and the one or more guide structures constituting a second portion extending substantially orthogonally to the first portion to extend across the plane of the interface between the output box and the busway bar.

2. The guide system of claim 1, the output box being a rotational-style output box, the rotational-style output box being configured to be selectably installed in the busway bar in a plurality of distinct installation configurations, and the one or more guide structures being configured to be selectably attached to the at least one of the rotational-style output box and the busway bar to (1) support each of the plurality of distinct installation configurations and (2) inhibit rotation of the rotational-style output box in an improper direction around the rotational axis for removal of the rotational style output box from the busway bar in a removal operation for any of the plurality of distinct installation configurations.

3. The guide system of claim 2, the guide appliance being adhesively affixed to an outer surface of the at least one of the rotational-style output box and the busway bar.

4. The guide system of claim 2, the guide appliance being mechanically attached to the at least one of the rotational-style output box and the busway bar.

5. The guide system of claim 4, the mechanical attachment using at least one of a screw, a bolt and nut, a clamp and a clip.

6. The guide system of claim 2, the rotational-style output box having a structural tab protruding from a side face of the rotational-style output box, the guide appliance being attached to the structural tab.

7. The guide system of claim 1, further comprising a labeling configured to be attached to at least one of an outer surface of the output box, an outer surface of the busway and a surface of the second portion of the guide appliance to provide a visual indication of a correct direction of rotation for removal of the output box from the busway bar in a removal operation.

8. The guide system of claim 1, further comprising an indicator component configured to be attached to an outer surface of the output box, the indicator component being electrically connected to the one or more guide structures and configured to provide a warning to a user that the output box is being rotated in an improper direction of rotation with respect to the busway bar.

9. The guide system of claim 8, the indicator component being electrically connected to a circuit that is activated to provide an indication that the output box is not under a load rendering the output box safe to remove from the busway bar.

10. The guide system of claim 1, the guide appliance comprising at least two separate pieces, the at least two separate pieces each having the first portion and the second portion and being configured to be structurally complementary to provide a substantially U-shaped configuration when put together and installed.

11. The guide system of claim 1, further comprising a labeling provided on an outer surface of the second portion that is viewable by a user when the guide appliance is installed to provide the user with an indication of a correct direction of rotation for removal of the output box from the busway bar in a removal operation.

12. The guide system of claim 1, the one or more guide structures being configured for retrofit into output box and busway bar installations without disturbing the output box and busway bar installations.

13. The guide system of claim 12, the one or more guide structures being provided in a kit form to support retrofit operations.

14. The guide system of claim 13, the kit form including:

a labeling configured to be attached to at least one of an outer surface of the output box, an outer surface of the busway and a surface of the second portion of the guide appliance to provide a visual indication of a correct direction of rotation for removal of the output box from the busway bar in a removal operation, and an indicator component configured to be attached to an outer surface of the output box to provide at least one of a warning to a user that the output box is being rotated in an improper direction of rotation with respect to the busway bar, and electrical energy flowing from the busway bar to the output box is interrupted rendering the output box safe to remove from the busway bar.

* * * * *